United States Patent
Peterson et al.

(10) Patent No.: US 7,153,479 B2
(45) Date of Patent: Dec. 26, 2006

(54) CATALYST REGENERATOR WITH A CENTERWELL

(75) Inventors: Robert B. Peterson, Sugar Land, TX (US); Chris Santner, Houston, TX (US); Michael Tallman, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 565 days.

(21) Appl. No.: 10/065,376

(22) Filed: Oct. 10, 2002

(65) Prior Publication Data

US 2004/0069681 A1 Apr. 15, 2004

(51) Int. Cl.
*B01J 8/18* (2006.01)
*B01J 8/24* (2006.01)
*B01J 8/26* (2006.01)
*C10G 11/18* (2006.01)
*C10G 9/32* (2006.01)

(52) U.S. Cl. ............... 422/145; 422/139; 422/147; 208/106; 208/113

(58) Field of Classification Search ............... 422/139, 422/145, 147; 208/106, 113
See application file for complete search history.

(56) References Cited

U.S. PATENT DOCUMENTS

| | | | |
|---|---|---|---|
| 3,661,800 A | 5/1972 | Pfeiffer et al. .............. 502/743 |
| 4,062,759 A * | 12/1977 | Castagnos et al. ........... 208/113 |
| 4,150,090 A * | 4/1979 | Murphy et al. .............. 422/144 |
| 4,615,992 A | 10/1986 | Murphy ........................ 502/41 |
| 5,043,522 A | 8/1991 | Leyshon et al. ............ 585/651 |
| 5,167,795 A | 12/1992 | Gartside ....................... 208/67 |
| 5,171,921 A | 12/1992 | Gaffney et al. ............. 585/653 |
| 5,220,093 A | 6/1993 | Gartside et al. ............ 585/661 |
| 5,271,826 A | 12/1993 | Krambeck et al. .......... 208/113 |
| 5,565,089 A * | 10/1996 | Ramachandran et al. ... 208/113 |
| 5,597,537 A | 1/1997 | Wegerer et al. ............. 422/144 |
| 5,730,859 A | 3/1998 | Johnson et al. ............... 207/78 |
| 5,965,012 A | 10/1999 | Lomas ........................ 208/113 |
| 6,113,776 A | 9/2000 | Upson ........................ 208/113 |
| 6,118,035 A | 9/2000 | Fung et al. ................. 585/653 |
| 6,797,239 B1 * | 9/2004 | Chen et al. ................. 422/144 |

FOREIGN PATENT DOCUMENTS

| | | |
|---|---|---|
| EP | 0413062 | 2/1991 |
| EP | 0413062 A | 2/1991 |
| WO | 9300674 | 1/1993 |
| WO | WO300674 A | 1/1993 |

* cited by examiner

*Primary Examiner*—Alexa D. Neckel
(74) *Attorney, Agent, or Firm*—Lundeen & Dickinson KBR IP Legal

(57) ABSTRACT

A catalyst regenerator for regenerating spent light FCC catalyst and heating the catalyst to supply heat to an FCC reactor. The regenerator has discharge outlets for catalyst and off gas and a valve for introducing spent catalyst through a central stand pipe portion. The regenerator houses a dense phase catalyst bed. A centerwell receives a lower end of the standpipe portion and defines an annulus therebetween. The spent catalyst is introduced through the standpipe portion into the annulus. A fuel distributor introduces fuel into the centerwell for mixing with the catalyst in the annulus. A fluidization distributor introduces fluidization gas into the centerwell for fluidizing the catalyst in the annulus. A radial slot in the centerwell introduces the catalyst and fuel mixture from the annulus below the upper surface of the dense phase bed. An air distributor located below the radial slot introduces combustion air into the dense phase bed.

10 Claims, 4 Drawing Sheets

CATALYST REGENERATOR WITH A CENTERWELL

BACKGROUND OF INVENTION

The present invention relates to catalyst recovery from a light FCC-type effluent, and also to regeneration of the recovered catalyst.

It has been proposed to produce light olefins such as ethylene and propylene from mixtures of heavier paraffin and olefins using a fluid catalytic cracking (FCC) system with the reaction conditions described, for example, in U.S. Pat. No. 5,043,522 to Leyshon et al.; U.S. Pat. No. 5,171,921 to Gaffney et al.; and U.S. Pat. No. 6,118,035 Fung et al. In this system, particulated catalyst and feedstock enter a reactor under specific reaction conditions. The reactor effluent is processed in a series of cyclone separators, usually housed in a vessel, that separate most of the catalyst from the effluent to be regenerated for recycle to a regenerator and then to the reactor, in a manner similar to conventional refinery FCC operations. The catalyst-lean hot effluent gases from the cyclones are then cooled and separated by fractional distillation, for example, into the product constituents.

There are, however, some significant differences between the light olefin FCC process and conventional refinery FCC operations. Conventional FCC processes produce an effluent that has significant quantities of heavier hydrocarbons that are condensed in a quench tower. There is also a minor amount of residual catalyst entrained in the effluent, that is not removed by the cyclones, which is collected with the heavier hydrocarbons condensed in the quench tower to form slurry oil. Slurry oil from the quench tower is often difficult to process and/or dispose of; frequently it is burned as a fuel oil. In the light olefin FCC process, there are only very minor quantities of heavier hydrocarbons in the effluent gas, i.e. a relatively high ratio of catalyst to fuel oil, so the removal of the catalyst fines becomes problematic because there is very little heavy oil recovered and any "slurry oil" would have a much higher catalyst loading than in the case of the conventional refinery FCC process.

Another issue in the light olefin FCC process is the regeneration of the catalyst recovered from the riser effluent by the cyclones. In the conventional refinery FCC unit, significant quantities of coke are formed in the riser and deposit on the catalyst particles. In the regenerator, this coke can be used as a fuel source for combustion with oxygen in the regenerator vessel to supply the heat needed to heat-balance the unit. Frequently, the regenerator may need to be cooled to prevent the catalyst from getting too hot, particularly when the feedstock deposits a lot of carbon on the catalyst. On the other hand, the prior art light olefin FCC process generally has insufficient coke deposition in the light olefin FCC process to support catalyst regeneration and the heat of reaction.

In a conventional gasoline FCC process, it has been suggested that supplemental fuel such as fuel gas or fuel oil (torch oil) can be introduced into the regenerator to achieve the temperatures required for catalyst regeneration and the heat of reaction during non-steady state operations, for example, when starting-up the unit, to achieve an adequate regenerator temperature. However, as far as applicant is aware, there are no adequate systems known for introducing fuel into the dense phase bed of a FCC regenerator processing low-carbon catalyst, for continuous operation.

Further, there is a need for a light olefin FCC process and system capable of processing a light feedstock that conventionally yields inadequate coke formation, yet improved somehow to achieve the heat of reaction required in the reactor.

SUMMARY OF INVENTION

The present invention addresses the catalyst handling problems in the light olefin FCC process noted above, preferably by using a fuel oil addition to the quench tower and recirculation of the quench tower oil to wash catalyst from the effluent gases, by recovering a slurry of the catalyst in the fuel oil from the recirculating quench oil, and by continuously introducing the slurry into the regenerator to recover the catalyst and supply the heat requirements for catalyst regeneration and the heat of reaction. In this manner, the fuel oil supplied for catalyst washing from the effluent gas can preferably be used to supply the heat requirements of the regenerator, and at the same time can eliminate catalyst losses in the effluent gas.

The present invention is a method and system for recovering fines from a light FCC-type effluent gas. The feedstock for such a light FCC unit is a feedstock that conventionally yields inadequate coke formation, for example, a $C_4$–$C_{12}$ feedstock, preferably a $C_4$–$C_8$ feedstock. Cracked gases from the reactor are cooled by direct contact with circulating oil, for example, in an oil quench tower. The catalyst fines carried with the reactor effluent are washed out from the gases. A circulating oil pump-around loop cools the gases and removes the fines. A slipstream of quench oil is sent to a catalyst separation system for separation of the catalyst fines. Catalyst removal can be achieved, for example, via filtration, hydroclonic separation, electrostatic precipitation, and a combination thereof. For example, when catalyst filtration is utilized, a slipstream of the quench oil can be sent through one of at least two filters to remove fines. Another filter is in backwash operation using compressed gas to remove the collected fines. The recovered fines are combined with quench oil to form a slurry that carries the fines to the FCC regenerator. The quench oil in the slurry is combusted in the regenerator to provide a convenient way of supplying FCC system heat requirements, while at the same time returning the catalyst fines recovered from the reactor effluent gas to the FCC system. In this manner, catalyst losses can be limited to any fines entrained in the regenerator exhaust from the dilute phase. Since there is a minimum amount of oil generated in the FCC, the quench oil is imported to inventory the quench tower and provide the heat required in the regenerator.

In one aspect, the present invention broadly provides a method for recovering catalyst fines from a light FCC-type effluent gas. The method includes the steps of: (a) supplying quench oil to maintain a steady state inventory thereof; (b) contacting the effluent gas with the quench oil to cool the effluent gas and wash out catalyst fines to obtain a cooled effluent gas essentially free of fines; (c) returning the quench oil from the contacting step to the inventory; (d) continuously recirculating quench oil from the inventory to the contacting step; (e) separating fines from a stream of the quench oil from the inventory to recover the fines and keep the fines from building up in the inventory; and (f) slurrying the fines recovered from the separation step.

In the method, the contacting and collecting steps can be effected in a quench tower comprising vapor-liquid contact elements and a bottoms zone that holds the inventory of quench oil. The recirculated quench oil can be cooled before the contacting step. The separation can be effected by any suitable means, for example, filtration, electrostatic separation and use of hydroclones, and the separation is preferably continuous.

When using filtration, the separation is preferably effected using at least two filters, wherein a first filter is in a filtration mode while a second filter in parallel is used for backwashing to remove the collected fines. The filtrate can be returned to the inventory. The filtration and backwashing can also include periodically alternating the first and second filters between filtration and backwashing modes. The backwashing preferably includes at least one compressed gas pulse through the at least one filter that is in the backwashing mode in the reverse flow direction to remove the separated fines, and collecting the separated fines in a holdup vessel. The separated fines are combined with a heavy oil, such as fuel oil or quench oil, to form a slurry, preferably in the holdup vessel.

The electrostatic precipitation process is similar to the filtration procedure insofar as multiple units are on-line, collecting catalyst fines, while one or more are being backwashed. This backwash step utilizes clean fuel oil or circulating quench oil. The separation is accomplished by inducing an electrical field across a packing medium. Catalyst particles are ionized and/or polarized and collected at contact points in the packing medium. Removal of the particles is accomplished by deactivating the electrodes and backflushing the freed particles.

The hydroclone separation process preferably has at least two stages of hydroclones in series with each stage containing multiple, small diameter hydroclones in parallel. The hydroclone operates by the same principal as a cyclone; specifically, centrifugal force is used to separate the oil and catalyst particles. Two stages are necessary at a minimum to concentrate the underflow stream. Typically, the underflow from the hydroclone is 20 to 40 percent of the total flow. The requirements of this process dictate that the solids be concentrated in the underflow stream which is 5 to 10 percent of the total inlet flow. By example, if the circulating oil is 50,000 lbs/hr and the net fuel oil is 5,000 lbs/hr, then the net underflow must be 10 percent of the total flow or 31.6 percent from each stage ($0.316 \times 0.316 = 0.1$). It is not necessary that the underflows from each stage be identical, but the net underflow must satisfy the fuel oil requirement. The underflow quantity is typically controlled by control valves on the outlets of the overflow and underflow streams.

A slurry is formed by combining the fines with a quench oil. Sometimes steam is added to further distribute the fines in the quench oil. The slurry from the holdup vessel is preferably introduced into a catalyst regenerator in a light FCC unit for combustion to supply the heat requirement of the FCC process. Slurry in excess of that required for combustion can be introduced into the reactor in the FCC unit where it is vaporized into the effluent gas. The makeup quench oil can be added directly to the inventory, the recirculation loop or as the filter backwash.

In another aspect, the present invention provides a system for recovering fines from a light FCC-type effluent gas. The system includes means for supplying quench oil to maintain a steady state inventory thereof, means for contacting the effluent gas with the quench oil to cool the effluent gas and wash out catalyst fines to obtain a cooled effluent gas essentially free of fines, means for returning the quench oil from the contacting step to the inventory, means for continuously recirculating quench oil from the inventory to the contacting step, means for separating fines from a stream of the quench oil from the inventory to recover the fines and keep the fines from building up in the inventory, and means for slurrying the fines recovered from the separation step.

A further aspect of the invention is a system for recovering fines from a light FCC-type effluent gas that includes a quench tower having an inlet for receiving the effluent gas, vapor-liquid contacting elements disposed above the inlet for cooling the effluent gas and washing out the fines, a gas outlet above the contacting elements for discharging cooled effluent gas essentially free of entrained fines, and a liquid holdup zone below the inlet for collecting quench oil from the contacting elements. A recirculation loop is provided for continuously recirculating the quench oil from the liquid holdup zone to the contacting elements. At least two filters are alternatingly operable in filtration and backwashing modes. A filtration loop is provided for circulating quench oil from the liquid holdup zone through a filtration-mode filter and returning filtrate to the liquid holdup zone. A backwashing loop is provided for removing the fines collected in the filter and passing the collected fines to a slurry collection zone. A heavy oil, for example, fuel oil or quench oil from inventory, is added to the slurry collection zone to form a slurry of the collected fines therein.

The system can also include a quench line for introducing the effluent gas into the inlet, the quench line including a mixing zone for receiving quench oil to cool the effluent gas, and a filtrate line from the filtration-mode filter to the mixing zone for supplying the filtrate as the quench oil. A line can be provided for supplying makeup quench oil to the quench tower or to the recirculation loop. Valves can be used in the backwash and recirculation loops for selectively placing the filters in filtration and backwash modes. The system can also include a source of compressed gas, a line from the source to the backwashing loop, and a valve in the line for pulsing the compressed gas into the backwashing loop to facilitate fines removal from the backwashing-mode filter.

The system, alternatively or additionally, includes a line for supplying the slurry from the slurry collection zone to the reactor in the FCC unit. Preferably, the system can include a line for supplying the slurry from the slurry collection zone into a dense phase bed of a regenerator for receiving and regenerating catalyst from the stripper for recirculation to a FCC reactor that supplies the effluent to the stripper. Preferably, the regenerator includes a mixing zone for mixing the slurry and the catalyst from the stripper and a discharge zone for introducing the mixture from the mixing zone within the dense phase bed, preferably below the top of the dense phase bed. The mixing zone is preferably an annulus centrally disposed within the dense phase bed. The regenerator can have a subjacent air distributor for introducing an oxygen-containing gas adjacent the discharge zone, preferably in the form of a pipe ring with perforations or multiple nozzles or, alternatively, a pipe grid with multiple branch arms around the annulus and below the discharge zone.

Still further, the present invention provides a catalyst regenerator for regenerating spent light FCC catalyst. The regenerator includes a regenerator vessel housing a dense phase catalyst bed, a central upright standpipe portion for receiving the spent catalyst to be regenerated, and a center-well receiving a lower end of the standpipe portion and defining an annulus between the standpipe portion and an inside diameter of the centerwell. There is a valve for controlling the introduction of spent catalyst from the standpipe portion into the annulus. In one embodiment useful in an FCC unit having a central vertical standpipe configuration, the valve is located at a lower end of the standpipe portion, which is at the lower end of the vertical standpipe. In another embodiment, the FCC unit is of a side by side design and the valve is a catalyst slide valve located in the pipe angled into the side of the regenerator. The angled pipe extends to the center of the regenerator and the standpipe portion is attached to or formed as part of the end thereof. A fuel distributor is provided for introducing fuel into the centerwell for mixing with the catalyst in the annulus. A fluidization distributor is provided for introducing fluidization gas into the centerwell for fluidizing the catalyst in the annulus. A radial slot is formed in the centerwell for introducing the catalyst and fuel mixture from the annulus into the dense phase bed below an upper surface thereof. An air distribution ring or pipe distributor is disposed in the dense phase bed about the centerwell subjacent to the radial slot for introducing combustion air into the dense phase bed. A catalyst discharge outlet is in fluid communication with the dense phase bed. An off gas discharge outlet is in fluid communication with a dilute phase above the dense phase bed. The regenerator can also include a source of fuel oil for supplying the fuel oil to the fuel distributor, a fluidization medium source for supplying a fluidization medium which is not an oxygen-containing gas, for example, steam, an inert gas, and fuel gas to the fluidization distributor, and/or a steam source for optionally supplying steam to the fuel distributor. The regenerator can further include an air preheater for heating air prior to introduction through the air distributor, for example, during a start-up.

Another aspect of the present invention is providing a method of converting an original FCC unit of side by side configuration to a converted FCC unit for processing light feedstock. In this method, the original FFC unit has at least an original regenerator, an angled spent catalyst supply line attached to the spent catalyst inlet, and a catalyst slide valve in the angled supply line. The regenerator has a spent catalyst inlet, an air inlet and an air distribution assembly attached to the air inlet within and near the bottom of the regenerator. The conversion involves replacing the original regenerator with a regenerator according to the present invention.

In one embodiment of such a conversion according to the present invention, the method includes removing the air supply assembly of the regenerator. A centerwell is installed on the interior bottom of the regenerator. A fluidization gas inlet and at least one fuel inlet is provided through the bottom of the regenerator within the centerwell. A fluidization gas distribution ring is installed and connected to the fluidization gas inlet. At least one fuel distribution nozzle is connected to a corresponding fuel inlet at the interior bottom of the regenerator within the centerwell. An air inlet is provided through the regenerator outside of the centerwell. A deflector plate is installed within the centerwell. An internal pipe is installed and connected to the spent catalyst supply inlet. The internal pipe has an angled portion at a similar angle to that of the angled spent catalyst supply line, a standpipe portion and an annular plate attached to the standpipe portion. The lower end of the standpipe portion extends into the centerwell creating a radial slot between the annular plate and the top edge of the centerwell. The lower end of the standpipe portion is spaced above the deflector plate to allow flow of spent catalyst through the standpipe portion and provide deflection of the spent catalyst flow direction for mixing the spent catalyst with fuel oil that is vaporized within the centerwell when the modified FCC unit is operated. An air distribution pipe is installed around the centerwell and below the radial slot and connected to the air inlet.

DETAILED DESCRIPTION

The present invention is a method and system for recovering fines from the light FCC effluent and regenerating spent catalyst. As used in the specification and claims, a light FCC unit or process is one in which the hydrocarbon feedstock to the FCC riser has a very low resid content such that there is insufficient carbon deposited on the catalyst to sustain combustion for regeneration without a supplemental fuel source, and there is insufficient fuel oil in the riser effluent for conventional slurry oil recovery, i.e. less than 2 weight percent of the hydrocarbons in the reactor effluent gases from the riser have an atmospheric boiling point above 550° F. (288° C.). However, if this amount is greater than 2 weight percent, the filters can optionally be bypassed and this material used as the slurry. The FCC process encompasses a fluidized catalytic reaction system, converting a light hydrocarbon feed stream preferably having a high olefin content to a product slate rich in propylene and ethylene. The typical propylene/ethylene product ratio from the reactor can be approximately 2.0. The FCC reactor is very flexible in that it can process many olefin-rich streams which may be available from an olefins plant or a refinery, such as, for example, olefins plant $C_4/C_5$ streams, refinery $C_4$'s, light naphtha produced in thermal or catalytic cracking processes, or the like.

Figure 1:
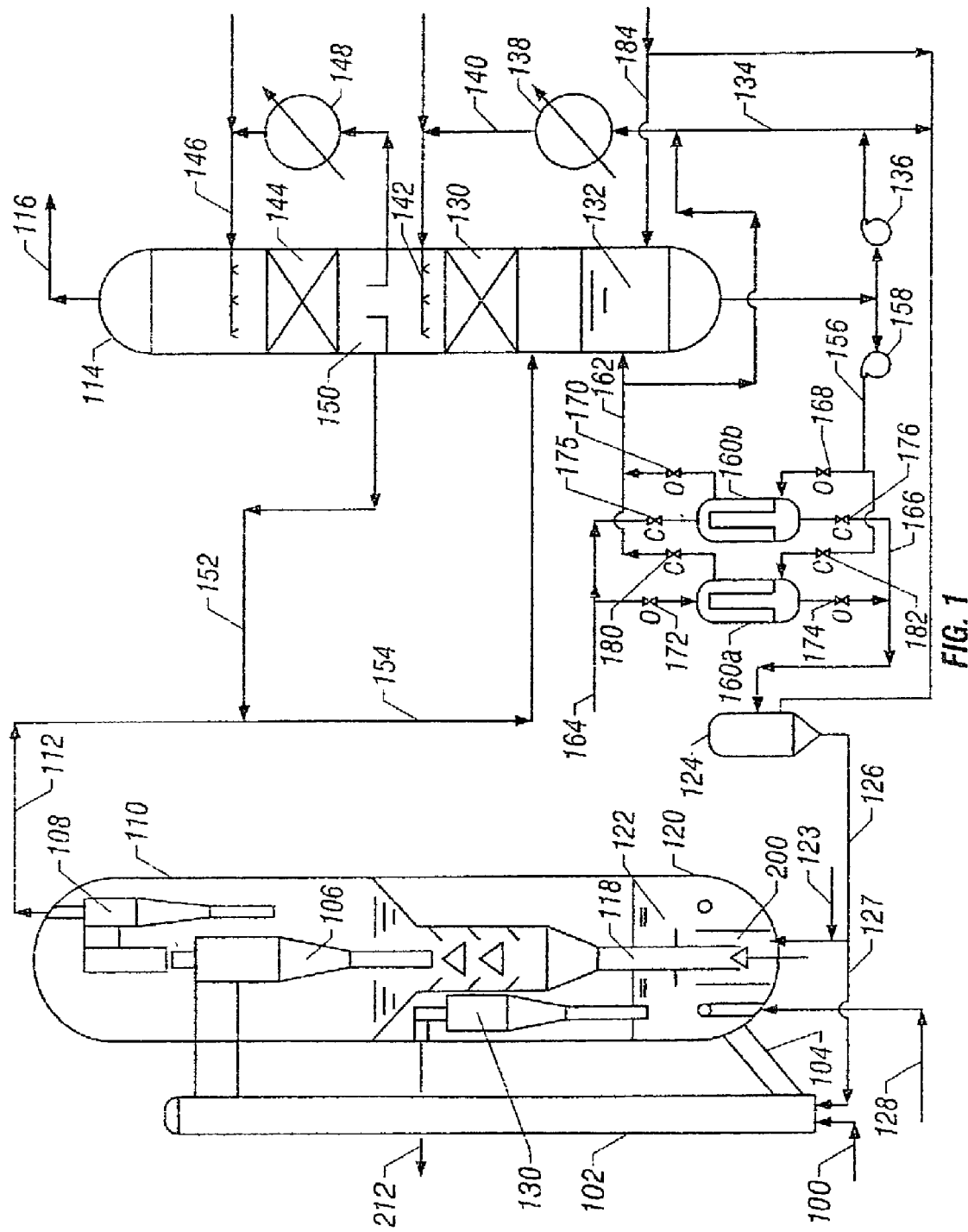
FIG. 1 is a simplified schematic process flow diagram of an FCC unit, including an oil quench tower, used to crack light hydrocarbons, according to one embodiment of the invention.

With reference to FIG. 1, a superheated feed, typically at 800° F., is introduced via line 100 to the riser 102 where it is mixed with hot regenerated catalyst supplied via line 104. If desired, steam can also be injected into the riser 102 at this point. Reaction conditions in the riser 102 are maintained as described in U.S. Pat. Nos. 5,043,522; 5,171,921; and 6,118,035; each of which is hereby incorporated herein by reference in its entirety. The hydrocarbon gases and catalyst flow upward in the riser 102, where the cracking reactions take place. The hydrocarbon gases and catalyst are separated in a series of conventional cyclones 106, 108, and the product gases at a typical temperature of 1100–1200° F. are routed out of the top of the stripper vessel 110 via line 112.

The effluent gases in line 112 can be cooled to generate steam in a waste heat boiler (not shown), and then are routed to a quench tower 114 where entrained catalyst is washed from the gases by contact with circulating quench oil. Overhead vapor from the tower 114 in line 116 at a typical temperature of 200–400° F. is then routed to conventional product recovery facilities such as distillation towers (not shown) for recovery of ethylene, propylene and other products.

Catalyst separated by the cyclones 106,108 is collected at the bottom of the stripper 110 and contacted with steam (not shown) to strip residual hydrocarbon gas from the catalyst. The steam and hydrocarbons exit the stripper 110 with the other effluent gases through the cyclone 108 and line 112 as previously mentioned.

The catalyst then flows down through standpipe 118 into the subjacent regenerator 120. In the regenerator 120, the small amount of coke that has formed on the catalyst is burned in the dense phase bed 122 and catalyst activity is restored for recirculation to the riser 102 via line 104 as previously mentioned. Because there is insufficient coke to provide the necessary heat of reaction to sustain regeneration at a typical regeneration temperature of 1250–1350° F., additional fuel is necessary to complete the heat balance on the reactor system. The fuel is preferably in the form of fuel oil, e.g. pyrolysis fuel oil, that contains catalyst fines from the quench tower 114 as described in more detail below, but capability for adding fuel gas can also be provided to supplement the heating if desired The slurry is continuously supplied to the regenerator 120 from the slurry surge drum 124 via line 126, which is designed for mitigating potential erosion.

Accessory systems include conventional FCC systems such as, for example, air supply, catalyst hoppers and flue gas handling and heat recovery. An air compressor (not shown) supplies air via line 128 for regeneration of the catalyst. An air heater (not shown) can be provided for startup. Fresh and spent catalyst hoppers (not shown) are provided for storage of makeup and used/equilibrium catalyst that is typically respectively added to or taken from the regenerator, as is well known in the art.

In the regenerator 120, catalyst is separated from the flue gas in one or more cyclones 130. If desired, a conventional third stage separator cyclone (not shown) can be used to minimize catalyst losses. The flue gases are typically cooled by superheating high pressure steam and vented. Spent catalyst, including fines from the third stage separator, contain no or only trace amounts of poisons found in typical refinery FCC catalyst due to the relatively cleaner feedstocks used in the light olefin FCC process, and can be used as an adjunct in concrete or brick manufacture or disposed in landfill.

The quench tower 114 includes a vapor-liquid contacting zone 130, which can include conventional packing or trays, disposed above a liquid holdup zone 132. Effluent gas from line 112 is introduced below the contacting zone 130. A recirculation loop 134 includes pump 136, heat exchanger 138 and return line 140 to introduce a continuous supply of quench oil to liquid distributor 142 above the contacting zone 130. In the contacting zone 130, the catalyst fines in the effluent gas are washed into the quench oil, and the effluent gas is cooled. The effluent gas typically enters the quench tower 114 at 800–1000° F., and exits at 200–400° F. The quench oil can be maintained in holdup zone 132 at a temperature of 350–700° F., and cooled to 300–550° F. in exchanger 138 against a feedstock stream or steam.

If desired, the quench tower 114 can include a secondary cooling zone 144 above the primary contacting zone 130, similarly configured with pump around loop 146 that includes exchanger 148 for further cooling the quench oil to 200–450° F., for example. A portion of the quench oil from collection zone 150 can be introduced via line 152 into line 112 to provide initial cooling of the effluent gases in mixing zone 154 upstream from the quench tower 114. For example, 500–550° F. quench oil in line 152 can cool the effluent gases to 800–1000° F. in the mixing zone 154.

A filtration loop 156 includes pump 158, filters 160*a*, 160*b* and line 162 for returning filtrate to the quench tower 114, either directly or via the recirculation loop 134. Backwash gaseous medium is provided via line 164 to pressurize and flush the collected fines into line 166 and slurry drum 124. The backwash gaseous medium can be selected from an inert gas, air and fuel gas. One of the filters 160*a* or 160*b* is in filter mode, while the other is in backwash mode. For example, valves 168, 170, 172 and 174 are open and valves 175, 176, 180 and 182 are closed when filter 160*a* is filtering and filter 160*b* is being backwashed; the valves are switched after the fines have accumulated in filter 160*a* and it is ready for backwashing. The filtration is preferably continuous and should be at a rate that keeps the fines level from building to excessive levels in the quench oil, preferably no more than 0.5 weight percent fines, more preferably no more than 0.2 weight percent, and yet more preferably no more than 0.1 weight percent fines in the quench oil. As an illustrative example, in a quench tower receiving 50 to 200 lbs/hr catalyst fines in the effluent gas, for example, 100 lbs/hr, then 50,000 lbs/hr of quench oil must be filtered in order to maintain a catalyst concentration of 0.2 weight percent in the recirculation loop 134. The backwash contains a high concentration of catalyst fines, on the order of 10 to 20 weight percent. This concentration is reduced to a manageable level, for example, 2 to 4 weight percent, by dilution in the slurry drum 124 with fuel oil from makeup line 184 and/or circulating quench oil from recirculation loop 134. The amount of dilution oil is preferably equal to that required for combustion in the regenerator. If the fines concentration is in excess of a manageable level, additional fuel oil and/or quench oil can be introduced to the slurry drum 124 and this excess can be recycled to the riser via line 127.

If desired, the compressed gas can conveniently pressurize the drum 124 so that it is not necessary to employ a pump to transfer the slurry into the regenerator 120 via line 126. As mentioned, quench oil slurry from the drum 124 is supplied to the regenerator 120 for combustion to supply the heating requirements and return the catalyst to the regenerator-riser system; however, if there is excess slurry, it can also be introduced to the riser 102 via line 127. In this manner, the quench oil in the slurry supplied to the riser 102 is added to the effluent gases via cyclones 106, 108 and subsequently condensed in the quench tower 114, whereas the entrained catalyst is eventually transferred into the regenerator 120 with the other catalyst recovered from the cyclones 106, 108.

Figure 2:
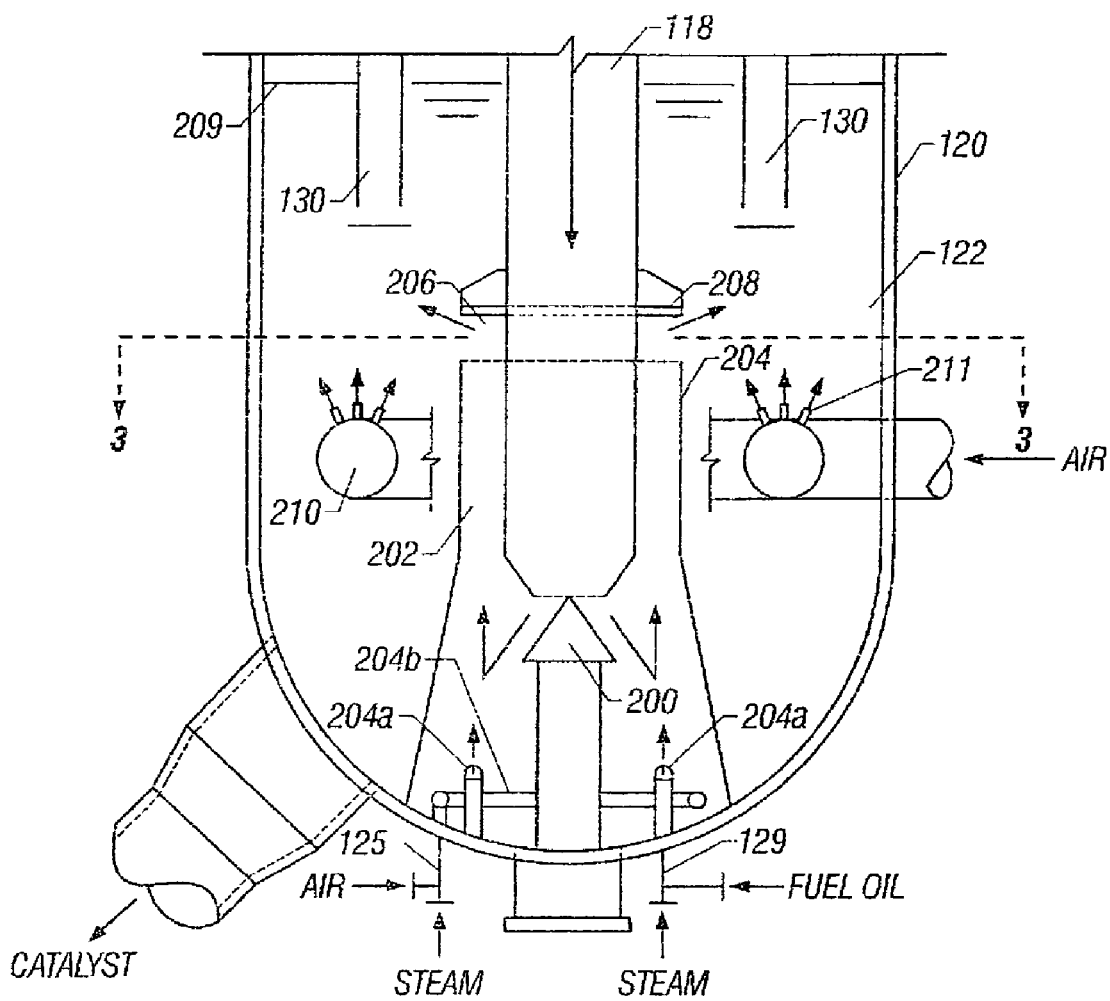
FIG. 2 is an enlarged elevation of a lower portion of the regenerator of FIG. 1 for regenerating catalyst in a light FCC unit using slurry of the fines from the filter backwash of the oil quench tower according to the present invention.
Figure 3:
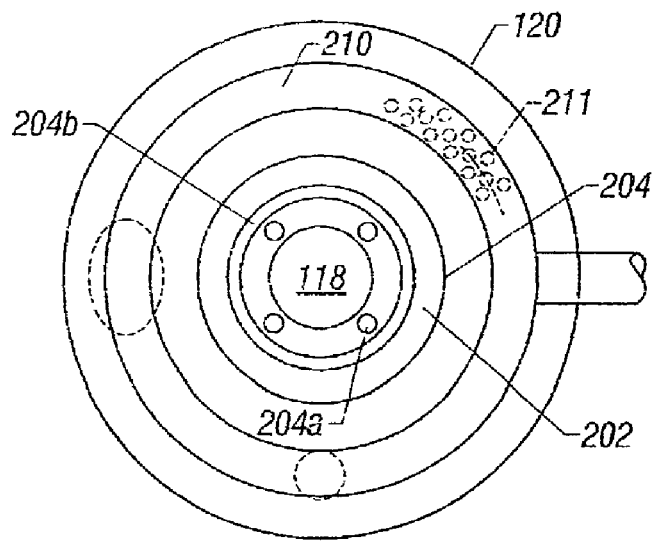
FIG. 3 is a plan of the regenerator of FIG. 2 as seen along the lines 3—3 in FIG. 2.

In the regenerator 120 (see FIGS. 2 and 3), there is a standpipe 118 and plug valve 200. Spent catalyst flows down the standpipe 118 and passes through the catalyst plug valve 200. After passing through the plug valve 200, the catalyst changes direction and flows upwardly through the annulus 202 of the spent catalyst centerwell 204 using a fluidization gas introduced via line 125 to distribution ring 204*b* positioned in the centerwell 204 below the valve 200. The fluidization medium or gas can be, for example, steam, an inert gas, and fuel gas. Slurry oil (line 126) and a fluidization gas (line 123) are introduced via line 129 through nozzles 204*a*. The fluidization gas, for example, steam, facilitates dispersion and atomization of the slurry oil as it discharges into the catalyst in the centerwell 204. The dispersion steam and the slurry oil, which vaporizes on contact with the hot spent catalyst, provide additional fluidization for the catalyst. At this point, vaporization of the slurry oil is required.

An oxygen-containing gas is preferably not used as the fluidization gas here in order to avoid, or at least minimize, combustion within the centerwell 204. The catalyst is diverted outwardly into the dense phase bed 122 from the circular slot 206 defined by the upper terminus of the centerwell 204 and an outer periphery of annular plate 208. The annular plate 208 is secured about the standpipe 118 and preferably has an outer diameter at least that of the centerwell 204. In this manner the catalyst is distributed radially outwardly into the dense phase catalyst bed 122 well below its upper surface 209.

The dense fluidized bed 122 is aerated by air provided by an air grid that preferably takes the form of air distribution ring 210. The ring 210 has a diameter between the outer diameter of the centerwell 204 and the outer diameter of the dense phase bed 122 in the regenerator 120. As the aeration air travels upward from perforations or nozzles 211 into the dense phase bed 122, the slurry oil and the carbon on the catalyst are burned to form $CO_2$. It is important to introduce the slurry oil/catalyst mixture into the dense phase bed 122 in relatively close proximity to the air and below the upper surface 209 of the bed 122 to ensure good combustion and heat generation within the bed 122. Typically, the regenerator 120 is operated at 1250 to 1350° F., preferably from 1275 to 1325° F. The convergence of the air from the ring 210 and the catalyst/oil mixture from the slot 206 at relatively high velocities within the dense phase bed 122 facilitates good mixing in a combustion zone within the bed 122 to provide uniform heating and regeneration of the catalyst. The regenerator bed should be designed for a superficial vapor velocity of between 0.5 and 7 ft/s, preferably between 1.5 and 5 ft/s, and more preferably between 2 and 3 ft/s. The volume of the bed 122 above the air ring 210 should be designed for sufficient residence time to ensure essentially complete regeneration of the catalyst.

Off gas is conventionally recovered overhead from the regenerator 120 via separator cyclones 130 and an overhead line 212 (see FIG. 1). Since the regenerator 120 is operated in a complete combustion mode, there is generally no need for a CO burner to convert the CO to $CO_2$ before discharge to the atmosphere, but one can be included if desired. More heat of combustion is generated, and hence less fuel oil is needed, when complete combustion is achieved. Excess air is generally avoided, but as a practical matter a slight excess is needed to achieve complete combustion.

The regenerator 120 can be operated with or without a CO promoter, typically a catalyst such as platinum, which is commonly added to promote the conversion of CO to $CO_2$.

Figure 4:
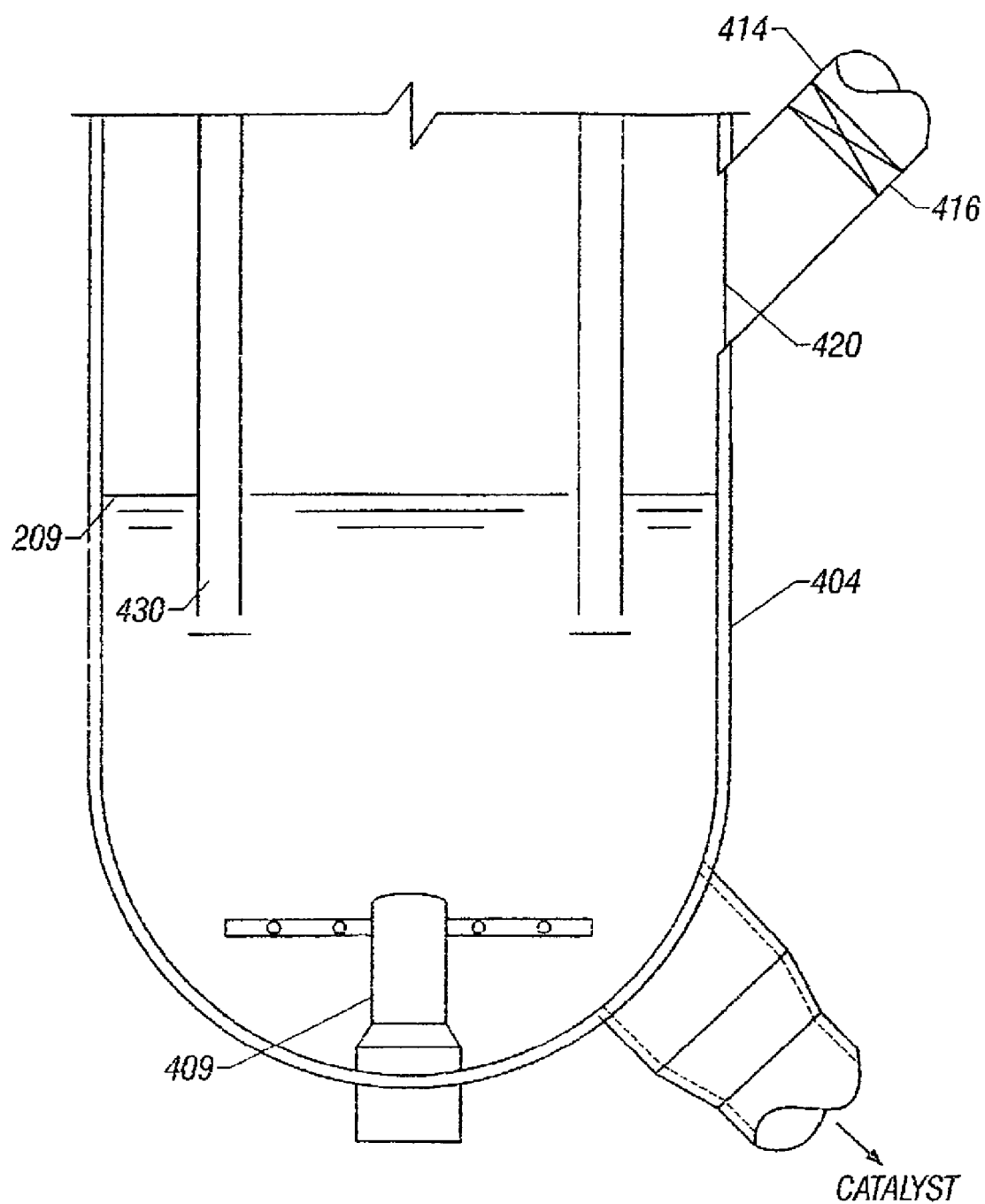
FIG. 4 (prior art) is an enlarged elevation of a lower portion of a regenerator having a side entry for catalyst used for regenerating catalyst in a conventional side by side FCC unit.

The lower portion 404 of a prior art side by side conventional FCC regenerator is shown in FIG. 4. Catalyst is fed to the regenerator via an angled pipe 414, a catalyst slide valve 416, and an inlet 420. The ends of a pair of hydroclones 430 extend below the upper surface 209 of the dense bed 122. Combustion air is fed into the dense bed 122 via an air feed apparatus 409.

Figure 5:
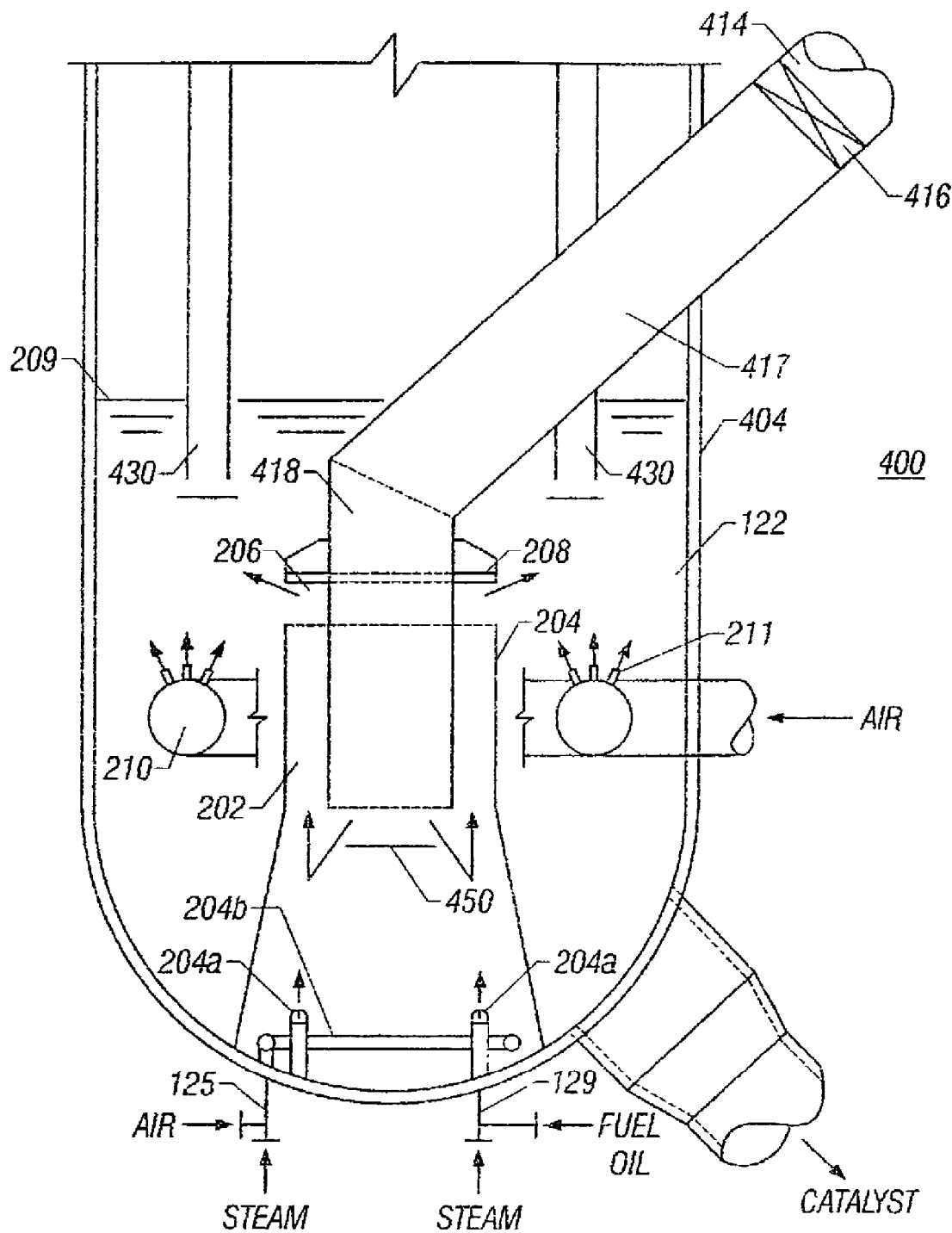
FIG. 5 is an enlarged elevation of a lower portion of another embodiment of a regenerator according to the present invention for regenerating catalyst in a light or conventional FCC unit in a side by side configuration.

The regenerator 400 shown in FIG. 5 is according to the present invention and is useful in a FCC unit having a side by side configuration and can be substituted for the regenerator shown in FIG. 4. Whether in a new installation or as part of a retrofit, such a regenerator 400 provides greater feed versatility to accept conventional or light feeds, since a fuel oil, quench oil or slurry oil feed capability is provided when processing light FCC feeds in order to provide the necessary heat of reaction.

The angled pipe 414 for catalyst feed no longer terminates at the inlet 420 as shown in FIG. 4. Rather, angled pipe 414 is coupled via the catalyst slide valve 416 to angled pipe 417 that extends therefrom substantially to the vertical center axis of the regenerator 400 and has a vertical stand portion 418 extending therefrom into the centerwell 204. A circular deflection plate 450 is located below the lower end of the stand portion 418 to redirect the catalyst flowing therethrough. The remaining components having like reference numerals are as in the previous figures.

Further, an FCC unit of side-by-side configuration having a conventional regenerator, for example, the regenerator shown in FIG. 4, can be converted to be a converted FCC unit having a regenerator 400 as shown in FIG. 5, thereby reducing the capital costs associated with the fabrication of a new regenerator. The air supply assembly would be removed. The centerwell 204, fluidization medium distribution ring 204*b* and fuel distribution nozzles 204*a* would be installed at the interior base of the regenerator within the centerwell 204. The air distribution pipe 210 would be installed around the centerwell 204 and below the radial slot 206. The deflector plate 450 would be installed within the centerwell 204. Pipe 417 with the standpipe portion 418 and annular plate 208 would be installed such that the end of the stand portion 418 extends into the centerwell 204 a sufficient distance above the deflector plate 450 to allow flow of the catalyst and provide adequate deflection of the catalyst flow direction for mixing the catalyst with the fuel oil vaporized within the centerwell 204. The hydroclones 430 may or may not have to be replaced or reconditioned or repositioned within the regenerator 400 such that their ends extend below the upper surface 209 of the dense bed 122.

The present invention is illustrated above with respect to specific embodiments. Various changes and modifications will occur to the skilled artisan in view thereof. It is intended that all such modifications within the scope and spirit of the appended claims be embraced thereby.

The invention claimed is:

1. A catalyst regenerator for regenerating spent light FCC catalyst and heating the catalyst to supply heat to an FCC reactor, comprising:
    a regenerator vessel housing a dense phase catalyst bed;
    a central upright standpipe portion for receiving the spent catalyst to be regenerated;
    a centerwell receiving a lower end of the standpipe portion and defining an annulus between the standpipe portion and an inside diameter of the centerwell;
    a valve for introducing spent catalyst through the standpipe portion into the annulus;
    a fuel distributor for introducing fuel into the centerwell for mixing with the catalyst in the annulus, wherein the fuel distributor is connected to a source of fuel oil;
    a fluidization distributor for introducing fluidization gas into the centerwell for fluidizing the catalyst in the annulus, wherein the fluidization distributor is connected to a source of a fluidization gas;
    a radial slot formed in the centerwell below an upper surface of the dense phase bed for introducing the catalyst and fuel mixture from the annulus into the dense phase bed below an the upper surface;
    an air distributor disposed in the dense phase bed subjacent to the radial slot for introducing combustion air into the dense phase bed;
    a catalyst discharge outlet in fluid communication with the dense phase bed; and
    an off gas discharge outlet in fluid communication with a dilute phase above the dense phase bed.

2. The regenerator of claim 1 wherein the air distributor is an air distribution ring disposed in the dense phase bed about the centerwell subadjacent to the radial slot.

3. The regenerator of claim 1 wherein the fuel distributor is at least one nozzle.

4. The regenerator of claim 1 wherein the fluidization gas is steam.

5. The regenerator of claim 1 further comprising a steam source for supplying steam to the fuel distributor.

6. The regenerator of claim 1 wherein the valve is located at a lower end of the standpipe portion.

7. The regenerator of claim 6 wherein the standpipe portion is a lower end of a central vertical standpipe located within the regenerator.

8. The regenerator of claim 1, wherein the regenerator has an angled spent catalyst supply line extending into the regenerator and the valve is located in the angled spent catalyst line prior to entering the regenerator and the standpipe portion extends from the angled spent catalyst supply line within the regenerator.

9. The regenerator of claim 8 wherein the standpipe portion is attached to the end of angled spent catalyst line.

10. The regenerator of claim 1 wherein the radial slot is defined by an upper end of a wall of the centerwell spaced from an annular plate disposed about the standpipe portion above the annulus to direct the mixture of fluidized spent catalyst and fuel radially outwardly from the centerwell into the dense phase bed.

* * * * *